(12) United States Patent
Levy

(10) Patent No.: US 7,328,048 B2
(45) Date of Patent: Feb. 5, 2008

(54) WIRELESS TELEPHONE HEADSET BUILT INTO EYEGLASSES

(76) Inventor: Isaac Levy, 325 Marbridge Rd., Lawrence, NY (US) 11559

( * ) Notice: Subject to any disclaimer, the term of this patent is extended or adjusted under 35 U.S.C. 154(b) by 492 days.

(21) Appl. No.: 11/087,984

(22) Filed: Mar. 23, 2005

(65) Prior Publication Data

US 2005/0164747 A1    Jul. 28, 2005

Related U.S. Application Data

(63) Continuation-in-part of application No. 10/744,837, filed on Dec. 23, 2003, now Pat. No. 7,079,876.

(51) Int. Cl.
*H04M 1/00* (2006.01)
(52) U.S. Cl. .................. 455/572.2; 455/569.1
(58) Field of Classification Search ............. 455/575.1, 455/575.2, 66.1, 90.3, 569.1; 351/158
See application file for complete search history.

(56) References Cited

U.S. PATENT DOCUMENTS

| | | | |
|---|---|---|---|
| 2,794,085 A | 5/1957 | De Angelis | |
| 4,888,805 A | 12/1989 | Karppala | |
| 4,902,120 A | 2/1990 | Weyer | |
| 5,258,785 A | 11/1993 | Dawkins, Jr. | |
| 5,463,428 A | 10/1995 | Lipton et al. | |
| 5,892,564 A | 4/1999 | Rahn | |
| 5,988,812 A | 11/1999 | Wingate | |
| 6,010,216 A * | 1/2000 | Jesiek ......................... | 351/158 |
| 6,045,224 A | 4/2000 | Kallenbach et al. | |
| 6,091,546 A | 7/2000 | Spitzer | |
| 6,091,832 A | 7/2000 | Shurman et al. | |
| 6,166,496 A | 12/2000 | Lys et al. | |
| 6,243,578 B1 | 6/2001 | Koike | |
| 6,582,075 B1 | 6/2003 | Swab et al. | |
| 6,629,076 B1 | 9/2003 | Haken | |
| 6,769,767 B2 | 8/2004 | Swab et al. | |

(Continued)

FOREIGN PATENT DOCUMENTS

WO    WO 01/06298 A1    1/2001

OTHER PUBLICATIONS

U.S. Appl. No. 09/888,280, filed Dec. 26, 2002, Peter Warren.

(Continued)

*Primary Examiner*—Lee Nguyen
(74) *Attorney, Agent, or Firm*—Hess Patent Law Firm, PC; Robert J. Hess

(57) ABSTRACT

The present invention relates to a wireless telephone headset for communicating with a wireless device, wherein the headset is built into an eyeglass frame, which includes a first temple and a second temple connected by a middle portion and the eyeglass frame has an interior and exterior portions. The headset includes an earpiece placed on an earpiece arm, a microphone placed on a microphone arm, a transceiver circuit placed in the interior of either the middle portion or the first and second temples, and a transceiver. The transceiver can be placed on either the earpiece or the microphone arms, or detachably coupled to the eyeglass frame. Further, the transceiver circuit can be movable within the interior of the temples. The headset is capable of wirelessly communicating with a wireless device upon actuation of the transceiver circuit.

20 Claims, 9 Drawing Sheets

U.S. PATENT DOCUMENTS 7,013,009 B2 * 3/2006 Warren .................. 379/420.01
7,079,876 B2 * 7/2006 Levy ........................ 455/575.2

OTHER PUBLICATIONS

U.S. Appl. No. 09/761,490, filed Jul. 18, 2002, Rei Inasaka.
U.S. Appl. No. 09/953,684, filed Jul. 4, 2002, Stephen G. Mann.
U.S. Appl. No. 09/746,484, filed Jul. 11, 2002, Rahul R. Vaid.
U.S. Appl. No. 09/843,942, filed Oct. 31, 2002, Gregory S. Snider.
U.S. Appl. No. 10/440,398, Jan. 8, 2004, Andrew Arthur Hunter.
Frog Design/Motorola Offspring Wearables Concept (Phone Scoop); Monday, Mar. 10, 2003; http://www.phonescoop.com/articles/moto_wearables/.

* cited by examiner

WIRELESS TELEPHONE HEADSET BUILT INTO EYEGLASSES

CROSS REFERENCE TO RELATED APPLICATIONS

This application is a continuation-in-part application of the U.S. patent application Ser. No. 10/744,837 to Levy, filed Dec. 23, 2003 now U.S. Pat. No. 7,079,876, and entitled "Wireless telephone headset built into eyeglasses," and incorporates its subject matter by reference herein in its entirety.

BACKGROUND OF THE INVENTION

1. Field of the Invention

The present invention relates a field of wireless telephone headsets. Specifically, the present invention relates to a wireless telephone headset built into an eyeglass frame.

2. Background Art

In today's technology, telephone headsets are frequently employed to carry out telephone conversations without having to hold a telephone in the hands. Use of such headsets is not only a convenience, but also a safety measure. An example of such safety measure would be hands-free use of a cellular telephone while driving. In some regions, hands-free use of the cellular telephone while driving is a law.

FIG. 1 is an example of a typical prior art telephone headset 100. The headset 100 includes a frame 106. A microphone 102 and a speaker 104 are attached to the frame 106. The microphone 102 is placed at one end of a microphone holder 112. The other end of the microphone holder 112 is coupled to the frame 106. As shown in FIG. 1, the speaker 104 is coupled to the other end of the microphone holder 112. The frame 106 further includes a rotational mechanism 114, which allows microphone holder 112 to rotate, as shown by a curved double-sided arrow A. By expanding or contracting an expandable section 110, coupled to frame 106, accommodates different users' head sizes. Contraction or expansion of the expandable section 110 is shown by a double-sided arrow B. A wire 118 with a plug 116 connects headset 100 to a telephone to allow a user to perform her conversations using the headset 100.

To use the headset 100, a user would place it over her head with the speaker 104 being placed against one ear and a support 108 of the frame 106 placed on the opposite side of the head near the other ear. The microphone 102 would be placed in the vicinity of the user's mouth. A plug 116 would be plugged into a telephone to assist the user in making and receiving telephone calls.

Other headsets may include just an earpiece and a microphone on one wire without being attached to a headset frame. With the advance of the technology, wireless headsets are also used.

Nonetheless, use of the headset 100 can be inconvenient and bulky. Some of the problems associated with the headset 100 would be for users wearing eyeglasses (prescription, non-prescription, sunglasses, and other). If a conventional headset is used, its frame interacts with eyeglass frame temples causing its user great discomfort. Additionally, use of such headset can tilt the eyeglasses and distort vision, thereby disorienting the user. Further, even if frameless headset is used, the earpiece placed inside user's ear will interact with eyeglass frame temples through the ear and, thus, constantly falling out of the user's ear. Also, headset wires cause users great discomfort and may tilt, throw off and break the eyeglasses. Numerous other problems exist with the use of a headset and eyeglasses together. Therefore, there is a need to provide a wireless telephone headset that is convenient for users wearing eyeglasses.

BRIEF SUMMARY OF THE INVENTION

The present invention is directed to a wireless telephone headset built into an eyeglass frame. The present invention includes an earpiece, a microphone, a transceiver and a wiring circuitry all coupled to an eyeglass frame.

In an embodiment, the present invention includes an earpiece coupled to a first temple of the eyeglass frame, whereas the microphone is coupled to a second temple of the eyeglass frame. A transceiver circuit is coupled to the first temple of the eyeglass frame. The transceiver circuit is electrically coupled to the speaker and the earpiece by having electrical wires run through the eyeglass frame. The transceiver circuit communicates with a transceiver installed on a telephone. The transceiver circuit further includes an actuation contact. Upon receipt of a call, user will activate transceiver circuit by pressing the actuation contact. This allows the eyeglass frame transceiver circuit and the telephone transceiver circuit to communicate with each other, and, in turn, allowing the user to employ the wireless eyeglass set to have a telephone conversation.

Other embodiments of the present invention include an earpiece, a microphone, and a transceiver circuit built into the same eyeglass temple.

Additionally, alternate embodiments of the present invention include the earpiece, the microphone, and the transceiver circuit being placed in the interior portions of the eyeglass temples. A user may pull out the microphone and the earpiece to carry out the telephone conversations. An actuation contact of the transceiver circuit can be placed on the exterior portion of the eyeglass temple.

In an embodiment, the transceiver circuit wirelessly communicates with the telephone by transmitting/receiving signals to/from a telephone's transceiver. A Blue Tooth technology can be used to carry out the communications between the transceiver circuit built into eyeglasses and the telephone's transceiver circuit.

In yet an alternate embodiment, the headset includes an earpiece placed on an earpiece arm, a microphone placed on a microphone arm, a transceiver circuit placed in the interior of either the middle portion or the first and second temples, and a transceiver. The transceiver can be placed on either the earpiece or the microphone arms, or detachably coupled to the eyeglass frame. Further, the transceiver circuit can be movable within the interior of the temples. The headset is capable of wirelessly communicating with a wireless device upon actuation of the transceiver circuit.

BRIEF DESCRIPTION OF THE DRAWINGS

In the drawings, like reference numbers indicate identical or functionally similar elements. Additionally, the left-most digit(s) of a reference number identifies the drawing in which the reference number first appears.

DETAILED DESCRIPTION OF THE INVENTION

1. Overview

The present invention is directed to a field of wireless headsets. More specifically, the present invention is a wireless headset built in to a pair of eyeglasses. The eyeglasses can be prescription eyeglasses, sunglasses, non-prescription eyeglasses, safety eyeglasses, eyeglass masks, or any other type of eyewear. The present invention allows a user to simultaneously use a telephone and a headset without taking off eyeglasses or being inconvenienced by wearing a bulky headset with eyeglasses. Furthermore, the present invention also addresses safety concerns for users wearing eyeglasses and telephone headsets while performing various tasks, such as driving, operating machinery, etc.

The present invention allows wireless communication with a telephone without having to put on a headset. For example, someone operating a vehicle and desiring to make a telephone call would not have to be distracted to put on a headset. Instead, if eyewear is being worn, the individual would activate the circuitry within the eyewear and proceed with making or answering telephone calls.

2. Wireless Telephone Headset Built into Eyeglasses

Figure 2:
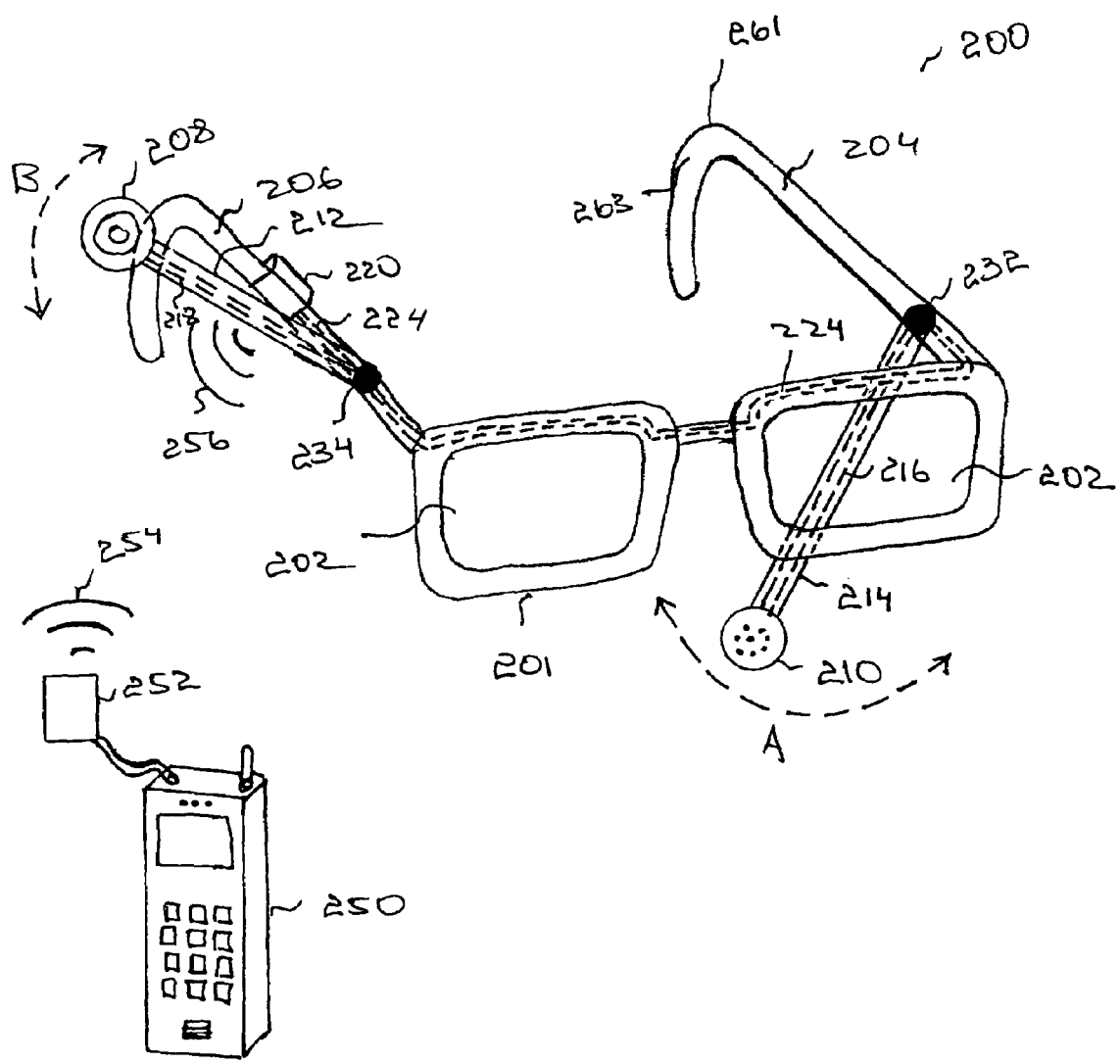
FIG. 2 illustrates an eyeglass telephone set having an earpiece and a microphone coupled to different eyeglass temples, according to the present invention.

FIG. 2 illustrates an embodiment of an eyeglass telephone set 200. The eyeglass telephone set 200 includes a frame 201 having glass portions 202, a first temple 204, and a second temple 206. Temples 204 and 206 are attached to the frame 201 by means of hinges, screws, glue, welding or any other binding material and/or method. The frame 201 and temples 204, 206 can be manufactured from plastic, metal, or any other material. A combination of the frame 201, glass portions 202, first temple 204, second temple 206 and the binding materials can be referred to as an eyeglass set.

The eyeglass telephone set 200 further includes a microphone 210, an earpiece 208, and a transceiver circuit 220. The microphone 210 is attached via a microphone arm 214 to the temple 204 at a pivotal point 232. The earpiece 208 is attached via an earpiece arm 212 to the temple 206 at a pivotal point 234. The transceiver circuit 220 is coupled to the temple 206.

The microphone 210, earpiece 208, and the transceiver circuit 220 are electrically wired through the frame 201 and the temples 204, 206. The microphone 210 is electrically coupled to a microphone electrical wire 216 that runs along the microphone arm 214 to the pivotal point 232. At the pivotal point 232, the microphone electrical wire 216 is coupled to a frame wire 224. The frame wire 224 runs along the frame 201, as shown by dashed lines in FIG. 1, and is coupled to the transceiver circuit 220. The earpiece 208 is electrically coupled to an earpiece electrical wire 218 that runs along the earpiece arm 212 to the pivotal point 234. At the pivotal point 234, the earpiece electrical wire 218 is coupled to the frame wire 224 that is further connected to the transceiver circuit 220. The electrical wires (216, 218, 224) can be attached to exterior portions of the frame 201 and/or temples 204, 206. Alternatively, the electrical wires can be placed in the interior portions of the frame 201 and/or temples 204, 206, as described below.

The frame 201 and temples 204, 206 further include an interior portion 263 and an exterior portion 261. The interior portion 263 is an opening going throughout the frame 201 and the temples 204, 206. Referring to FIG. 3b, a portion 350 of the frame 201 (or the temples 204, 206) is shown. The exterior portion 261 is further shown enclosing the hollow interior portion 263. In an embodiment, an electrical wire can be placed through the interior portion of the frame 201 or the temples 204, 206 (not shown in FIG. 3b).

Figure 1:
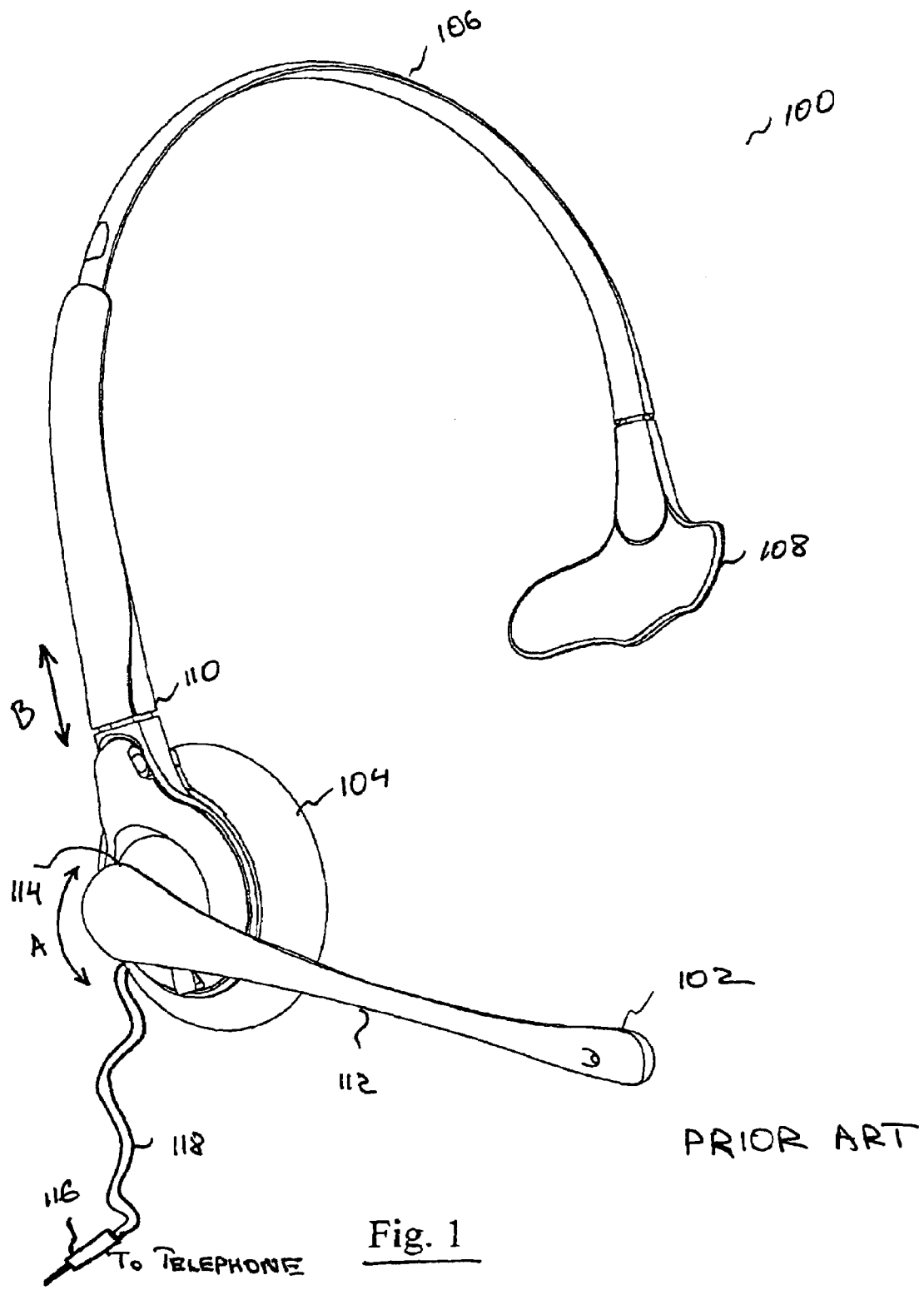
FIG. 1 is an example of a conventional telephone headset.

According to the embodiment of FIG. 1, the frame wire 224 is placed in the interior portion 261 of the respective frame 201 and temples 204, 206. Additionally, the earpiece arm 212 and the microphone arm 214 can include the exterior portion 261 and the interior portion 263. Thus, the earpiece electrical wire 218 can be placed in the interior portion 263 of the earpiece arm 212. Similarly, the microphone electrical wire 216 can be placed in the interior portion 263 of the microphone arm 214.

Pivotal mounting at pivotal point 232, allows microphone arm 214 to rotate along curved arrow A in relation to frame 201 and temples 204, 206. Such rotation allows microphone 210 to be properly adjusted in relation to user's mouth. Analogously, the earpiece arm 212, mounted at pivotal point 234, rotates along curved arrow B in relation to the frame 201 and the temples 204, 206. This allows the user to place the earpiece 208 inside or near the user's ear.

The transceiver circuit 220 wirelessly communicates with a telephone transceiver 252 coupled to telephone 250, as shown in FIG. 1. The transceiver circuit 220 and the telephone transceiver 252 communicate by exchanging signals 254 and 256. In the present embodiment, such wireless communication is achieved using Blue Tooth technology. As can be understood by one having ordinary skill in the relevant art, other methods of wireless communication between the transceiver circuit 220 and the telephone transceiver 252 are possible. The transceiver circuit 220 and the telephone transceiver 252 can have a specific distance range at which both are able to communicate with each other without any interruptions.

Figure 3A:
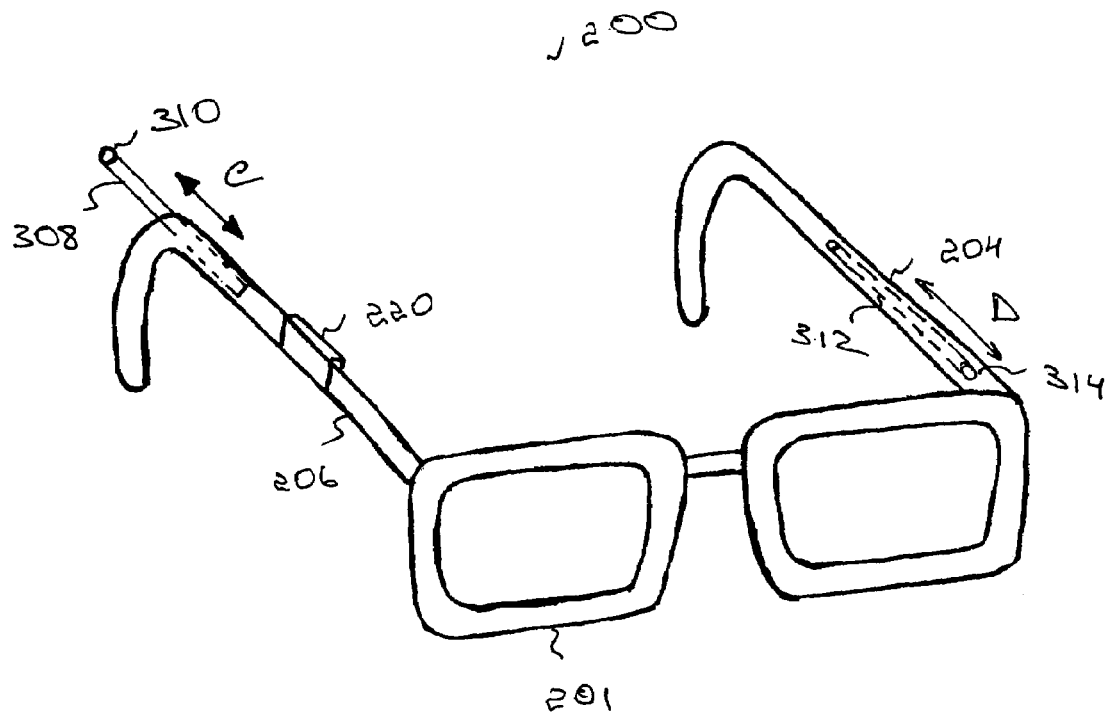
FIG. 3a illustrates an eyeglass telephone set having an earpiece and a microphone being placed inside eyeglass temples, according to the present invention.
Figure 3B:
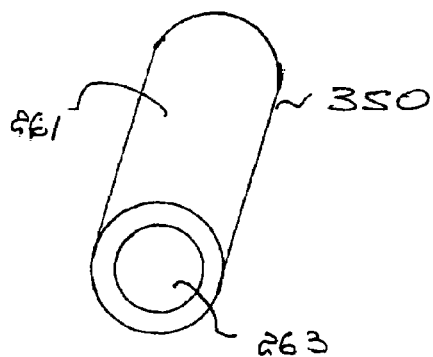
FIG. 3b illustrates exterior and interior portions of an eyeglass temple, according to the present invention.
Figure 3C:
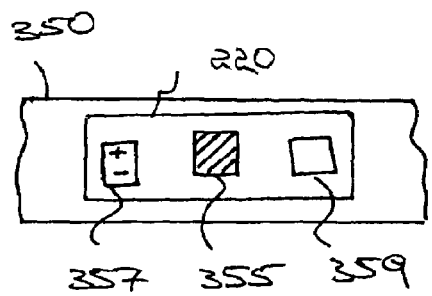
FIG. 3c illustrates a transceiver coupled to an eyeglass temple, according to the present invention.

An embodiment of the transceiver circuit 220 is shown in FIG. 3c. FIG. 3c illustrates the transceiver circuit 220 coupled to a portion 350 of the frame 201 or temples 204, 206. The transceiver circuit 220 is coupled to the exterior portion 263. Alternatively, the transceiver circuit 220 is coupled to the interior portion 261.

An embodiment of the transceiver circuit 220 includes a power source 357, an actuation contact 355 and a circuitry 359. The power source 357 powers the transceiver circuit 220, the microphone 210 and the earpiece 208 to allow usage of the telephone eyeglass set 200. The actuation contact 355 activates or deactivates the transceiver circuit 220. Activation of the transceiver circuit 220 allows a user to employ telephone eyeglass set 200 to make and receive telephone calls. Deactivation of the transceiver circuit 220 terminates user's ability to make and receive telephone calls. In this embodiment, the actuation contact 355 is a push button switch having an "on" and an "off" positions (not shown). Pressing the button to "on" position will activate the telephone eyeglass set 200. Pressing the button to "off" position will deactivate the telephone eyeglass set 200. In an alternative embodiment, the actuation contact 355 is any other switch capable of activating and deactivating the telephone eyeglass set 200.

The power source 357 can be a battery. Upon drainage, the battery can be replaced or recharged. As can be understood by one having ordinary skill in the relevant art, telephone eyeglass set 200 may include at least one power source 357. The power source 357 does not have to be coupled to the transceiver circuit 220 and can be placed anywhere on the frame 201 or the temples 204, 206. Also, the telephone eyeglass set 200 can include at least one power source 357.

Referring back to FIG. 1, the position of the transceiver circuit 220 is not limited to the temples 204, 206 or the frame 201. Similarly, the earpiece 208 and the microphone 210 are not limited to the positions described in FIG. 1, as illustrated below.

FIG. 3a illustrates an alternate embodiment of the telephone eyeglass set 200. The frame 201 and the temples 204, 206 are described above with respect to FIG. 2. The telephone eyeglass set 200 includes an earpiece 310, a microphone 314, and a transceiver circuit 306. The earpiece 310 is coupled to an earpiece arm 308. The earpiece arm 308 extends in and out of the interior portion of the first temple 206, as shown by double-sided arrow C. The earpiece 310 is located on the outside of the temple 206 when a portion of the earpiece arm 308 is taken out of the temple 206, while another portion of the earpiece arm 308 remains in the interior portion of the temple 206. When the user desires to use the telephone eyeglass set 200, she slides out the earpiece arm 308 and places it near her ear. The earpiece arm 308 can be further adjusted to be closer to the user's ear by pulling it up/down or rotating it.

The microphone 314 is coupled to a microphone arm 312. Similarly to the earpiece arm 308, the microphone arm 312 extends in and out of the interior portion of the temple 204, as shown by the double-sided arrow D. The microphone 314 is located on the outside of the temple 204 when a portion of the microphone arm 312 is taken out of the temple 204, while another portion of the microphone arm 312 remains in the interior portion of the temple 204. When the user desires to speak into the microphone 314, she slides the microphone arm 312 out of the interior portion of the temple 204. The microphone arm 312 can be further adjusted to be closer to the user's mouth by pulling it up/down or rotating it.

The microphone 314 and the earpiece 308 are coupled to the transceiver circuit 220 (not shown in FIG. 3a). The electrical wiring of these components and the operation is described above with respect to FIG. 1.

Figure 4:
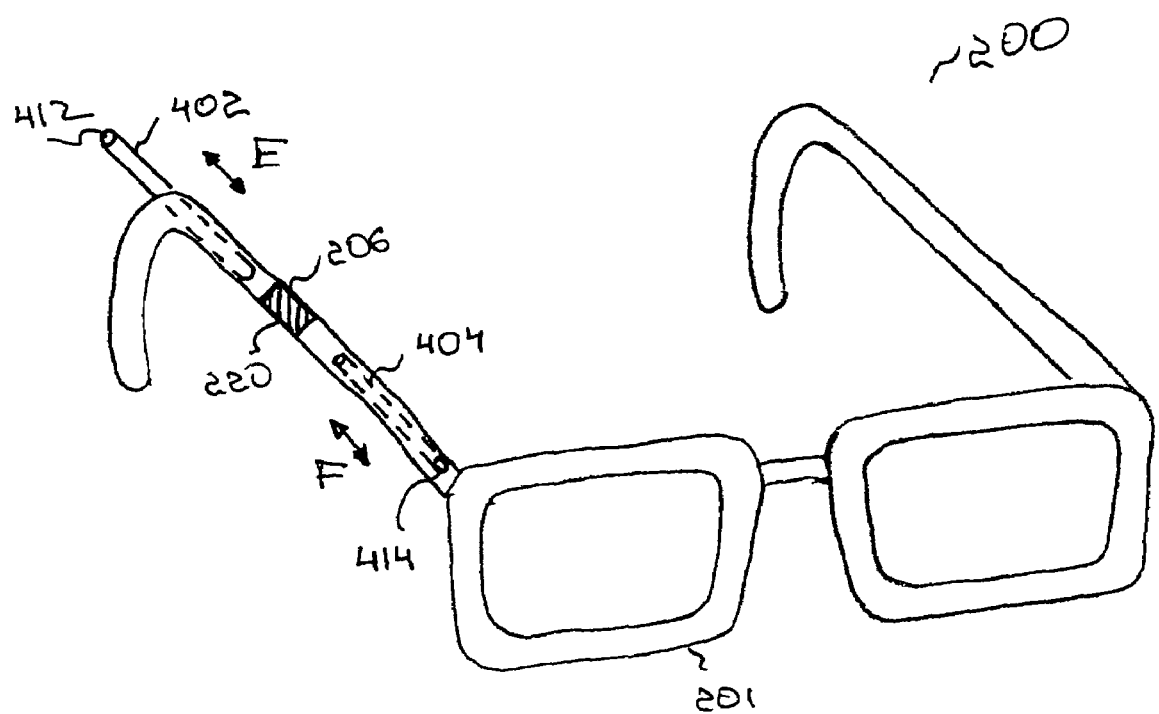
FIG. 4 illustrates an eyeglass telephone set having an earpiece and a microphone built into the same eyeglass temple, according to the present invention.

FIG. 4 illustrates another embodiment of the eyeglass telephone set 200. The frame 201 and the temples 204, 206 are described above with respect to FIG. 2. The eyeglass telephone set 200 includes a microphone 414, an earpiece 412, and a transceiver circuit 220. In this embodiment, the microphone 414 is coupled to the microphone arm 404. The microphone arm 404 extends in and out of the interior portion of the temple 206, as shown by the double-sided arrow F. The microphone 414 is located on the outside of the temple 206 when a portion of the microphone arm 404 is taken out of the temple 206, while another portion of the microphone arm 404 remains in the interior portion of the temple 206.

The earpiece 412 is coupled to the earpiece arm 402. The earpiece arm 402 extends in and out of the interior portion of the first temple 206, as shown by double-sided arrow E. The earpiece 412 is located on the outside of the temple 206 when a portion of the earpiece arm 402 is taken out of the temple 206, while another portion of the earpiece arm 402 remains in the interior portion of the temple 206.

The transceiver circuit 220 is also located on the first temple 206 along with the earpiece 412 and the microphone 414. The electrical wiring between these elements is similar to the one described above in FIG. 1.

Figure 5:
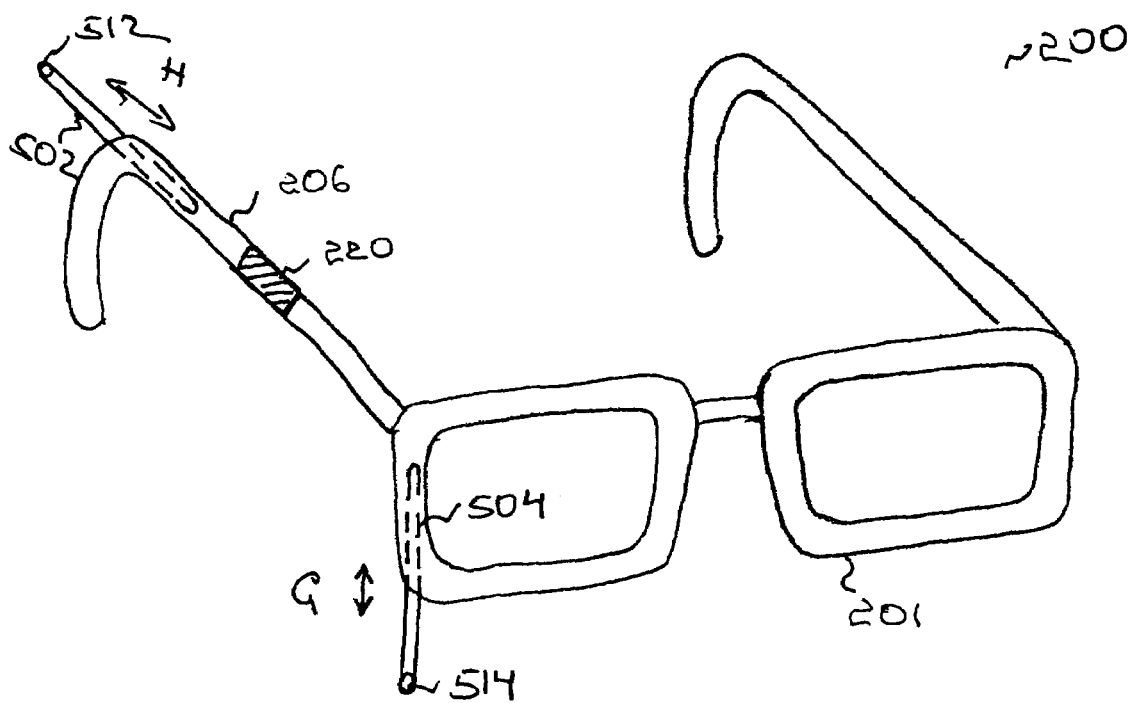
FIG. 5 illustrates an eyeglass telephone set having an earpiece built into an eyeglass temple and a microphone built into a glass-holding frame, according to the present invention.

FIG. 5 illustrates another embodiment of the eyeglass telephone set 200. The frame 201 and the temples 204, 206 are described above with respect to FIG. 2. The eyeglass telephone set 200 includes a microphone 514 that is coupled to the microphone arm 504. The microphone arm 504 is able to extend in and out of the interior portion of frame 201, as shown by double sided arrow G. Other elements of the eyeglass telephone set 200 are similar to the ones described above.

In the embodiments of FIGS. 3a, 4, and 5, the location of the earpiece, the microphone and the transceiver circuit can be interchanged. Further, the earpiece, the microphone, and the transceiver circuit can be appropriately sized to improve aesthetical appearance of the eyeglass telephone set 200. The earpiece arm and the microphone arm can automatically extend in and out of the interior portions of the frame 201 and temples 204, 206, if so desired.

Figure 6A:
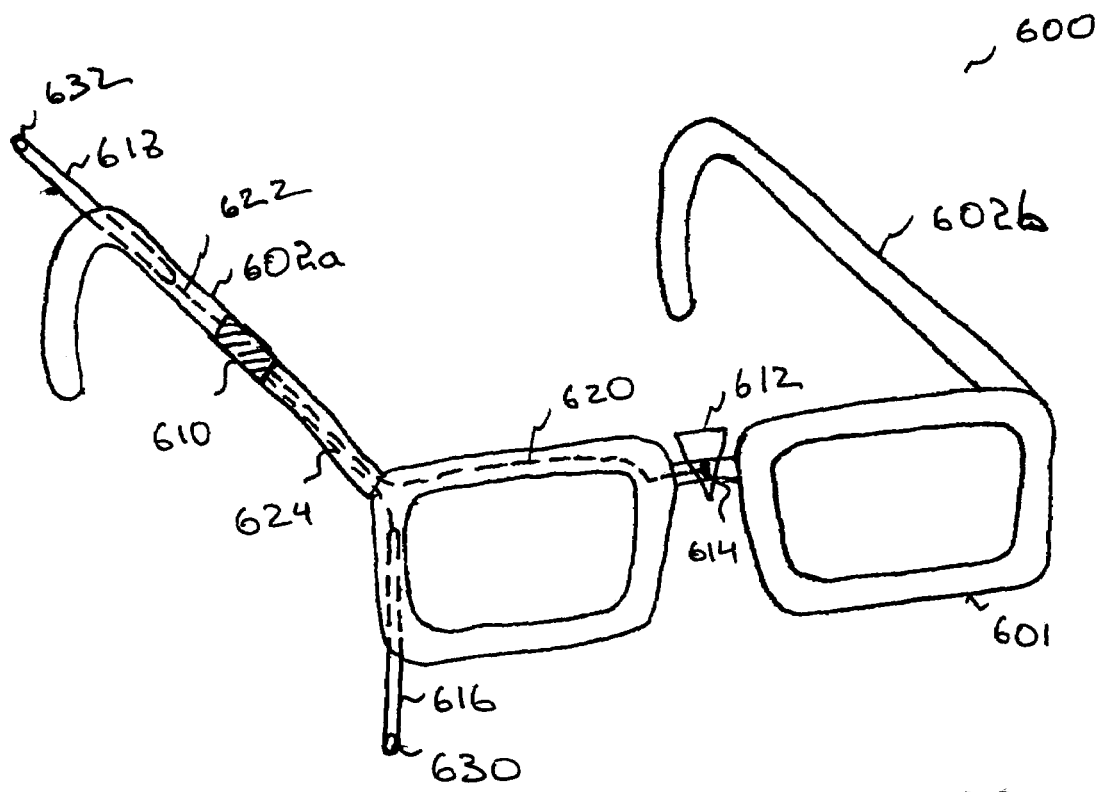
FIG. 6a illustrates an eyeglass telephone set having a removable transceiver attached to the bridge of the eyeglass frame, according to the present invention.

FIG. 6a illustrates an eyeglass telephone set 600 having a frame/middle portion 601, temples 602a and 602b. Frame 601 further includes a slidable microphone arm 616 having a microphone 630 placed at an outer end of the arm, as shown in FIG. 6a. As stated with respect to FIGS. 1-5, the microphone arm 616 can be pulled from an interior of the frame 601 and pushed back inside it. Temple 602a further includes an earpiece arm 618 and an earpiece 632 placed at an outer end of the arm. The earpiece arm 618 is similar in operation to the microphone arm 616.

The frame 601 further includes contact 614 that can be coupled to a transceiver 612. The contact 614 can be located anywhere on the frame 601. In the embodiment of FIG. 6a, the contact is placed on the bridge of the frame 601. The frame 601 and temple 602a also include wiring 620, 622, and 624 connecting various electronic components, including microphone 630, earpiece 632, electrical contact 614, of the eyeglass telephone set 600 to the circuitry 610. The circuitry 610 is similar to the one shown in FIG. 3c. The circuitry 610 does not include a transceiver, since one is detachably placed on the bridge of the frame 601.

Figure 6B:
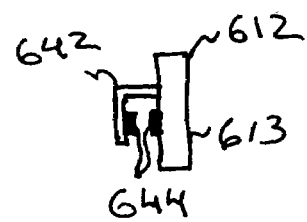
FIG. 6b illustrates the removable transceiver shown in FIG. 6a, according to the present invention.

FIG. 6b illustrates the transceiver 612 having a clipping arm 642 attached to a body 613 of the transceiver 612. The transceiver 612 is a conventional wireless transceiver capable of transmitting and receiving signals from a mobile telephone, a personal digital assistant ("PDA"), or any other device capable of transmitting and receiving signals. The body 613 and clipping arm 642 include contacts 644. Contacts 644 interact with the contact 614 on the bridge of the frame 601. The arm 642 is configured to friction fit over the bridge of the frame 601. As can be understood by one having ordinary skill in the relevant art, the transceiver 612 can be attached to the headset 600 using magnets, VELCRO, adhesives, or other known methods of temporarily attaching components. The eyeglass telephone set 600 can communicate with a transceiver in a mobile phone, PDA, or any other device having a wireless transceivers in it, when the transceiver 612 is placed in contact with the contact 614. Connecting the contacts 614 and 644 closes the electrical chain between earpiece, microphone, transceiver circuit, and transceiver. This allows a user to wirelessly communicate with other wireless devices. As can be understood by one having ordinary skill in the relevant art, the placement of microphone arm 616, earpiece arm 618, circuitry 620, and transceiver 614 is not limited to the locations shown in FIG. 6a. Further, the transceiver 612 can serve as a decorative piece complementing the eyeglass frame.

Figures 7A, 7B:
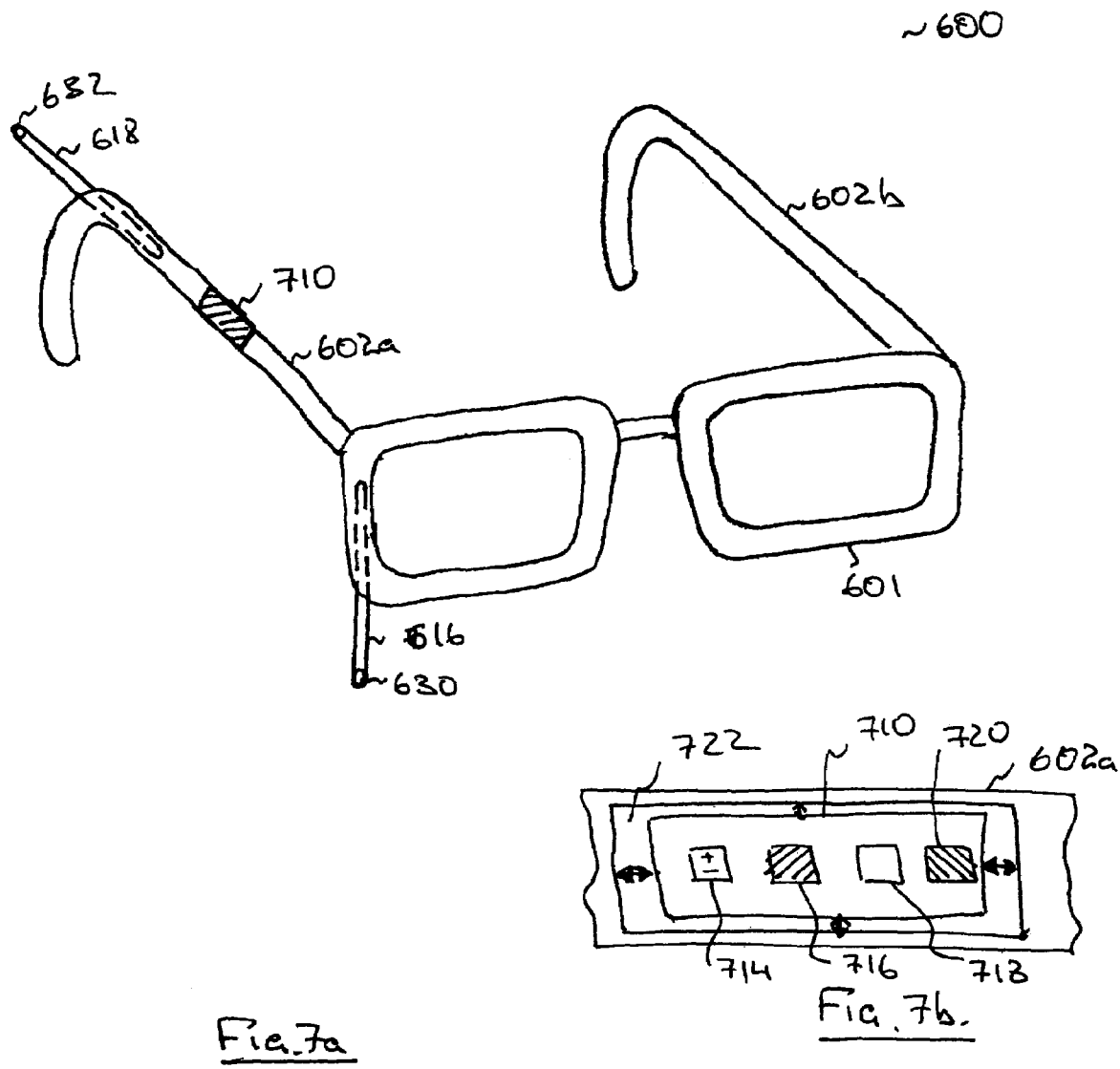
FIG. 7a illustrates an eyeglass telephone set having a transceiver circuitry being loose inside a temple of the eyeglass frame, according to the present invention.
FIG. 7b illustrates the transceiver circuitry shown in FIG. 7a, according to the present invention.

FIGS. 7a and 7b illustrate an alternate embodiment of the eyeglass telephone set 600 having a transceiver circuitry 710 loose or movable inside a temple 602a interior cavity. FIG. 7b illustrates transceiver circuitry 710 having a battery 714, an actuation contact 716, a transceiver 718, and a circuitry 720. The operation of the circuitry 710 is described with respect to FIGS. 3a-3c above. The transceiver circuitry is placed in an interior cavity 722 within the temple 602a. As illustrated by the bidirectional arrows, the transceiver circuitry 710 is able to move inside the cavity 722 in various directions. The movement is not limited to horizontal and/or vertical as shown in FIG. 7b.

Figure 8A:
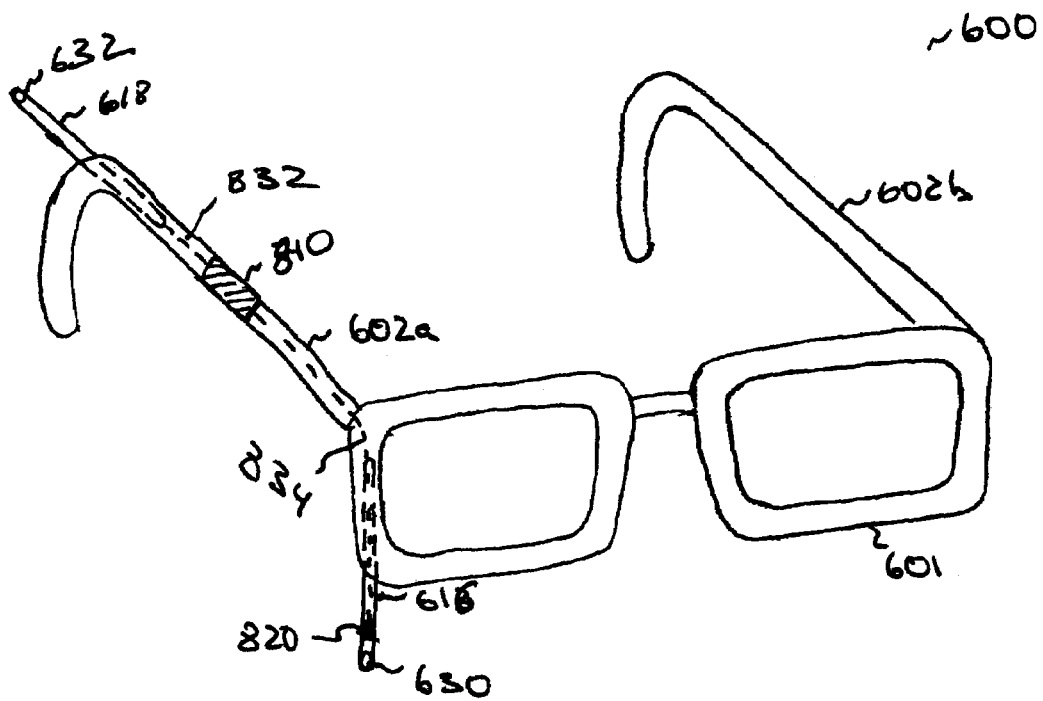
FIG. 8a illustrates an eyeglass telephone set having a transceiver built into a microphone arm, according to the present invention.
Figure 8B:
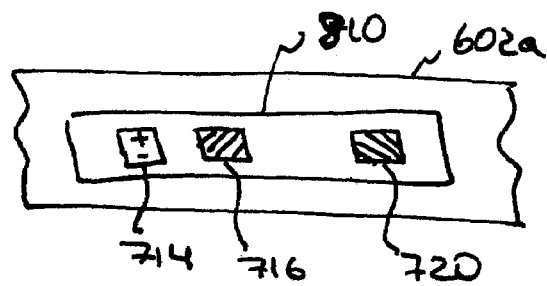
FIG. 8b illustrates a transceiver circuit of the eyeglass telephone set shown in FIG. 8a, according to the present invention.

FIGS. 8a and 8b illustrate yet another embodiment of the eyeglass telephone set 600. In this embodiment, the eyeglass telephone set 600 includes a transceiver 820 placed on the microphone arm 616. Thus, the transceiver 820 is not part of a circuitry 810, which includes the battery 714, actuation contact 716, and circuitry 720. The circuitry 810 is placed inside the temple 602a. The eyeglass telephone set 600 further includes wiring 832 and 834 connecting various components of the set.

As stated with respect to FIGS. 6a-7b, the microphone arm 616 can be pulled out from the interior of the frame 601. Once the arm 616 is pulled out, the transceiver 820 along with the microphone 630 are located outside of the interior of the frame 601. As can be understood by one having ordinary skill in the relevant art, the transceiver 820 can be located on the earpiece arm 618 and can be configured to be pulled out from the interior of the temple 602a. Further, electrical wiring connects the earpiece, microphone, transceiver, and the transceiver circuit. The headset is activated using an actuation contact on the transceiver circuit, as described above. This allows a user to wirelessly communicate with other wireless devices using the transceiver.

Figure 9:
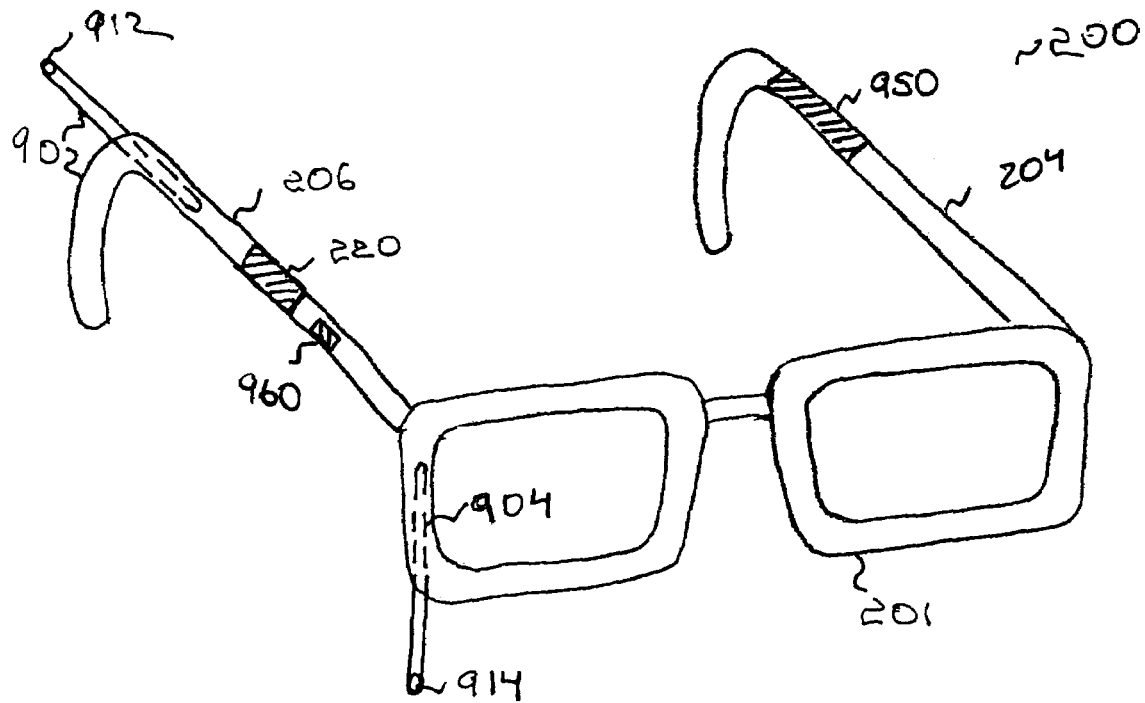
FIG. 9 illustrates another embodiment of an eyeglass telephone set having a stereo earpiece built into the eyeglass frame, according to the present invention.

FIG. 9 illustrates another embodiment of the eyeglass telephone set 200 having a frame 201 with a microphone 914 coupled to microphone arm 904, a first earpiece 912 coupled to earpiece 902 in the temple 206, a circuitry 220, a ringer 960, and a second earpiece 950 placed in the temple 204. The ringer 960 is coupled to the circuitry 220. It is activated, when a call is placed to a wireless device (such as a wireless telephone, a PDA, a blackberry, etc.). The ringer 960 can play sounds, melodies, etc. when such call is received. As such, a user of the telephone set 200 is able to hear that a call is being made and quickly locate the set 200, if the set is not on the user.

The second earpiece 960 is configured to communicate with the transceiver circuit 220. In an embodiment, the second earpiece 960 can be hardwired through the frame 201 and temples 204 and 206 to the first earpiece 912 and the transceiver circuit 220. In an alternate embodiment, the second earpiece 960 wirelessly communicates with the transceiver circuit 220 and the first earpiece 912. In this case, the second earpiece 960 can include a wireless transceiver communicating with the first earpiece 912 and the transceiver circuit 220. A time delay (such as a microsecond) may be associated with sound travel between the first earpiece 912 and the second earpiece 960.

This allows a user to employ both earpieces when the telephone set 200 is in use. For example, when a call is received by a wireless device coupled to the telephone set 200, the user is able to hear the caller in stereo rather than in one ear. The second earpiece 960 can have a similar structure as the earpiece 912. In other words, the earpiece 960 can be coupled to an earpiece arm that can be extended from temple's 204 interior.

3. Conclusion

Example embodiments of the methods and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A wireless telephone headset for communicating with a wireless device, wherein the headset is built into an eyeglass frame, which includes a first temple and a second temple connected by a middle portion and the eyeglass frame has an interior and exterior portions, comprising:
    an earpiece configured to be pulled out from an interior of at least one of said first temple and said second temple;
    a microphone configured to be pulled out from an interior of at least one of said first temple and said second temple;
    a transceiver circuit coupled to at least one of said first temple and said second temple;
    a transceiver detachably coupled at least one said middle portion, said first temple, and said second temple;
    wherein said transceiver further comprises an electrical contact configured to electrically interact with a frame electrical contact;
    wherein said transceiver circuit is operatively connected to said earpiece, said microphone, and said frame electrical contact;
    wherein when said transceiver electrical contact interacts with said frame electrical contact, the headset wirelessly communicates with said wireless device.

2. The headset of claim 1, wherein said connections between said earpiece, said microphone, said frame electrical contact, and said transceiver circuit are placed in said interior of at least one of said middle portion, first and second temples.

3. The headset of claim 1, wherein said earpiece is coupled to an earpiece extendable arm configured to be pulled out from said interior of at least one said first and second temples.

4. The headset of claim 1, wherein said microphone is coupled to a microphone arm configured to be pulled out from said interior of at least one of said first and second temples.

5. The headset of claim 1, wherein said transceiver is configured to activate electrical connections between said transceiver circuit, said microphone, said earpiece when said transceiver electrical contact contacts said frame electrical contact.

6. The headset of claim 1, wherein said transceiver circuit further comprises a power source.

7. A wireless telephone headset for communicating with a wireless device, wherein the headset is built into an eyeglass frame, which includes a first temple and a second temple connected by a middle portion and the eyeglass frame has an interior and exterior portions, comprising:
- an earpiece configured to be pulled out from an interior of at least one of said first temple and said second temple;
- a microphone configured to be pulled out from an interior of at least one of said first temple and said second temple;
- a transceiver circuit coupled to at least one of said first temple and said second temple;
- wherein said transceiver circuit further comprises a transceiver;
- wherein said transceiver circuit is operatively connected to said earpiece and said microphone;
- wherein said transceiver circuit is movable within said interior of at least one said first and second temples;
- wherein said transceiver circuit further comprises an actuation contact having an open and a closed position and when said actuation contact is in said closed position, the headset wirelessly communicates with said wireless device.

8. The headset of claim 7, wherein said connections between said earpiece, said microphone, and said transceiver circuit are within said interior of at least one of said middle portion, first and second temples.

9. The headset of claim 7, wherein said earpiece is coupled to an earpiece extendable arm configured to be pulled out from said interior of at least one said first and second temples.

10. The headset of claim 7, wherein said microphone is coupled to a microphone arm configured to be pulled out from said interior of at least one of said first and second temples.

11. The headset of claim 7, wherein said actuation contact is further configured to activate electrical connections between said transceiver circuit, said microphone, said earpiece.

12. The headset of claim 7, wherein said transceiver circuit further comprises a power source.

13. A wireless telephone headset for communicating with a wireless device, wherein the headset is built into an eyeglass frame, which includes a first temple and a second temple connected by a middle portion and the eyeglass frame has an interior and exterior portions, comprising:
- an earpiece configured to be pulled out from an interior of at least one of said first temple and said second temple;
- a microphone configured to be pulled out from an interior of at least one of said first temple and said second temple;
- a transceiver circuit coupled to at least one of said first temple and said second temple;
- a transceiver coupled to at least one of said earpiece and said microphone;
- wherein said transceiver circuit is operatively connected to said earpiece, said microphone, and said transceiver;
- wherein said transceiver circuit further comprises an actuation contact having an open and a closed position and when said actuation contact is in said closed position, the headset wirelessly communicates with said wireless device.

14. The headset of claim 13, wherein said connections between said transceiver circuit, said earpiece, said microphone, and said transceiver are within said interior of at least one of said frame, first and second temples.

15. The headset of claim 13, wherein said earpiece is coupled to an earpiece extendable arm configured to be pulled out from said interior of at least one said first and second temples.

16. The headset of claim 13, wherein said microphone is coupled to a microphone arm configured to be pulled out from said interior of at least one of said first and second temples.

17. The headset of claim 13, wherein said actuation contact is further configured to activate electrical connections between said transceiver circuit, said microphone, said earpiece, and said transceiver.

18. The headset of claim 13, wherein said transceiver circuit further comprises a power source.

19. The headset of claim 13, further comprising a second earpiece coupled to other of said at least one of said first temple and said second temple.

20. The headset of claim 19, wherein said earpiece and said second earpiece provide a stereo sound in said headset.

* * * * *